US008292172B2

(12) United States Patent
Logan et al.

(10) Patent No.: US 8,292,172 B2
(45) Date of Patent: Oct. 23, 2012

(54) ENHANCED RECORDATION DEVICE FOR RAIL CAR INSPECTIONS

(75) Inventors: Prescott Logan, Satellite Beach, FL (US); David Davenport, Niskayuna, NY (US); John Hershey, Ballston Lake, NY (US); Rahul Bhotika, Albany, NY (US); Robert Mitchell, Waterford, NY (US); Emad Andarawis, Ballston Lake, NY (US); Kenneth Welles, Scotia, NY (US); Robert Alan Wetzel, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 1494 days.

(21) Appl. No.: 11/785,904

(22) Filed: Apr. 20, 2007

(65) Prior Publication Data

US 2007/0194115 A1 Aug. 23, 2007

Related U.S. Application Data

(63) Continuation-in-part of application No. 10/901,746, filed on Jul. 28, 2004, now Pat. No. 7,832,638.

(60) Provisional application No. 60/490,861, filed on Jul. 29, 2003.

(51) Int. Cl.
*G06F 19/00* (2011.01)

(52) U.S. Cl. ........................................................ 235/385

(58) Field of Classification Search ................... 702/182
See application file for complete search history.

(56) References Cited

U.S. PATENT DOCUMENTS

| | | | |
|---|---|---|---|
| 3,575,594 | A | 4/1971 | Elcan |
| 3,734,433 | A | 5/1973 | Metzner |
| 3,794,834 | A | 2/1974 | Auer, Jr. et al. |
| 3,839,964 | A | 10/1974 | Gayot |
| 3,895,584 | A | 7/1975 | Paddison |
| 3,944,986 | A | 3/1976 | Staples |
| 4,099,707 | A | 7/1978 | Anderson |
| 4,122,523 | A | 10/1978 | Morse et al. |
| 4,361,300 | A | 11/1982 | Rush |
| 4,361,301 | A | 11/1982 | Rush |
| 4,610,206 | A | 9/1986 | Kubala et al. |
| 4,669,047 | A | 5/1987 | Chucta |
| 4,791,871 | A | 12/1988 | Mowll |
| 4,843,575 | A | 6/1989 | Crane |
| 4,883,245 | A | 11/1989 | Erickson, Jr. |
| 4,926,343 | A | 5/1990 | Tsuruta et al. |
| 4,937,743 | A | 6/1990 | Rassman et al. |
| 5,038,290 | A | 8/1991 | Minami |

(Continued)

FOREIGN PATENT DOCUMENTS

CA 2057039 12/1990

(Continued)

OTHER PUBLICATIONS

Crone, et al., "Distributed Intelligent Network Management for the SDI Ground Network," IEEE, 1991, pp. 722-726, MILCOM '91.

(Continued)

*Primary Examiner* — Thien M Le
*Assistant Examiner* — Sonji Johnson
(74) *Attorney, Agent, or Firm* — GE Global Patent Operation; John A. Kramer

(57) ABSTRACT

A device for conducting rail car inspections including an inspection module, an imaging module, a scanner module, a location module, a printer module and a communication module.

24 Claims, 1 Drawing Sheet

U.S. PATENT DOCUMENTS

| | | | | | |
|---|---|---|---|---|---|
| 5,063,506 | A | | 11/1991 | Brockwell et al. | |
| 5,177,684 | A | | 1/1993 | Harker et al. | |
| 5,222,192 | A | | 6/1993 | Shafer | |
| 5,229,948 | A | | 7/1993 | Wei et al. | |
| 5,237,497 | A | | 8/1993 | Sitarski | |
| 5,265,006 | A | | 11/1993 | Asthana et al. | |
| 5,289,563 | A | | 2/1994 | Nomoto et al. | |
| 5,311,438 | A | | 5/1994 | Sellers et al. | |
| 5,331,545 | A | | 7/1994 | Yajima et al. | |
| 5,332,180 | A | | 7/1994 | Peterson et al. | |
| 5,335,180 | A | | 8/1994 | Takahashi et al. | |
| 5,365,516 | A | | 11/1994 | Jandrell | |
| 5,390,880 | A | | 2/1995 | Fukawa et al. | |
| 5,420,883 | A | | 5/1995 | Swensen et al. | |
| 5,437,422 | A | | 8/1995 | Newman | |
| 5,463,552 | A | | 10/1995 | Wilson et al. | |
| 5,467,268 | A | | 11/1995 | Sisley et al. | |
| 5,487,516 | A | | 1/1996 | Murata et al. | |
| 5,488,558 | A | * | 1/1996 | Ohki | 701/207 |
| 5,541,848 | A | | 7/1996 | McCormack et al. | |
| 5,623,413 | A | | 4/1997 | Matheson et al. | |
| 5,745,735 | A | | 4/1998 | Cohn et al. | |
| 5,794,172 | A | | 8/1998 | Matheson et al. | |
| 5,823,481 | A | | 10/1998 | Gottschlich | |
| 5,825,660 | A | | 10/1998 | Cagan et al. | |
| 5,828,979 | A | | 10/1998 | Polivka et al. | |
| 5,850,617 | A | | 12/1998 | Libby | |
| 6,032,905 | A | | 3/2000 | Haynie | |
| 6,115,700 | A | | 9/2000 | Ferkinhoff et al. | |
| 6,125,311 | A | | 9/2000 | Lo | |
| 6,144,901 | A | | 11/2000 | Nickles et al. | |
| 6,154,735 | A | | 11/2000 | Crone | |
| 6,250,590 | B1 | | 6/2001 | Hofestadt et al. | |
| 6,351,697 | B1 | | 2/2002 | Baker | |
| 6,377,877 | B1 | | 4/2002 | Doner | |
| 6,393,362 | B1 | | 5/2002 | Burns | |
| 6,405,186 | B1 | | 6/2002 | Fabre et al. | |
| 6,459,965 | B1 | | 10/2002 | Polivka et al. | |
| 6,587,764 | B2 | | 7/2003 | Nickles et al. | |
| 6,637,703 | B2 | | 10/2003 | Matheson et al. | |
| 6,654,682 | B2 | | 11/2003 | Kane et al. | |
| 6,766,228 | B2 | | 7/2004 | Chirescu | |
| 6,789,005 | B2 | | 9/2004 | Hawthorne | |
| 6,799,097 | B2 | | 9/2004 | Villarreal Antelo | |
| 6,799,100 | B2 | | 9/2004 | Burns | |
| 6,804,626 | B2 | * | 10/2004 | Manegold et al. | 702/182 |
| 6,853,889 | B2 | | 2/2005 | Cole | |
| 6,856,865 | B2 | | 2/2005 | Hawthorne | |
| 7,006,796 | B1 | | 2/2006 | Hofmann et al. | |
| 2003/0084119 | A1 | * | 5/2003 | Ichimura | 709/217 |
| 2003/0105561 | A1 | | 6/2003 | Nickles et al. | |
| 2003/0183729 | A1 | | 10/2003 | Root et al. | |
| 2004/0010432 | A1 | | 1/2004 | Matheson et al. | |
| 2004/0034556 | A1 | | 2/2004 | Matheson et al. | |
| 2004/0093196 | A1 | | 5/2004 | Hawthorne | |
| 2004/0093245 | A1 | | 5/2004 | Matheson et al. | |
| 2004/0094621 | A1 | * | 5/2004 | LaMont | 235/384 |
| 2004/0145866 | A1 | * | 7/2004 | Lilenfeld | 361/686 |
| 2004/0267415 | A1 | | 12/2004 | Lacote et al. | |
| 2005/0023347 | A1 | | 2/2005 | Wetzel et al. | |
| 2005/0107890 | A1 | | 5/2005 | Minkowitz et al. | |
| 2005/0171661 | A1 | * | 8/2005 | Abdel-Malek et al. | 701/33 |
| 2005/0192720 | A1 | | 9/2005 | Christie et al. | |
| 2006/0074544 | A1 | | 4/2006 | Morariu et al. | |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 3/1963 |
| GB | 1321054 | 6/1973 |
| JP | 3213459 | 9/1991 |
| WO | WO 90/03622 | 4/1990 |
| WO | WO 93/15946 | 8/1993 |

OTHER PUBLICATIONS

Ghedira, "Distributed Simulated Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

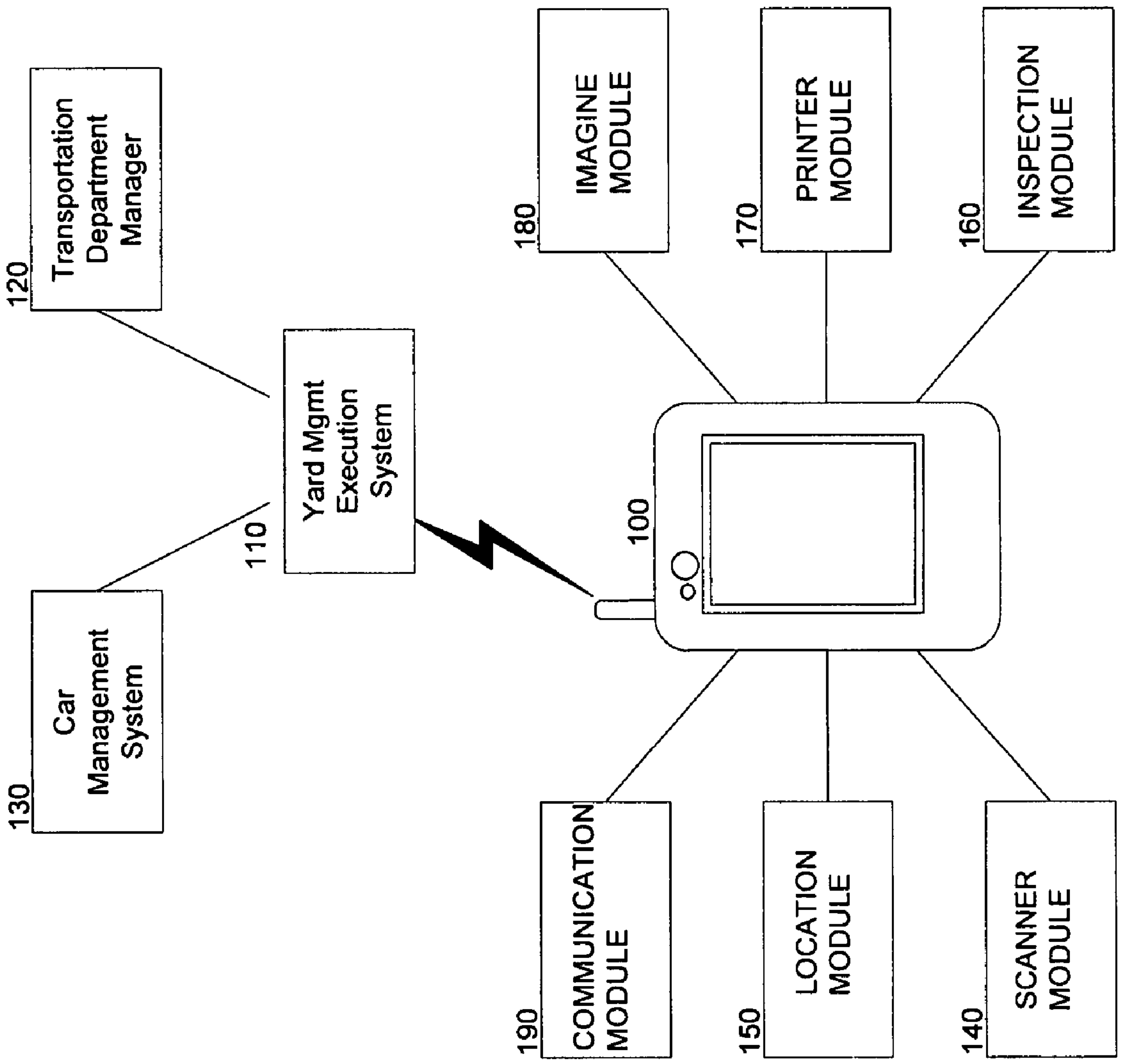
120
Transportation Department Manager
110
Yard Mgmt Execution System
130
Car Management System
100
180
IMAGINE MODULE
170
PRINTER MODULE
160
INSPECTION MODULE
190
COMMUNICATION MODULE
150
LOCATION MODULE
140
SCANNER MODULE

ENHANCED RECORDATION DEVICE FOR RAIL CAR INSPECTIONS

This application is a continuation in part of U.S. patent application Ser. No. 10/901,746, filed Jul. 28, 2004 now U.S. Pat. No. 7,832,638, which claims the benefit of U.S. Provisional Application No. 60/490,861, filed Jul. 29, 2003, both of which are hereby incorporated by reference. This application is related to the commonly owned U.S. application Ser. No. 11/374,012, titled "A System and Method Of Rail Yard Planning" filed Mar. 14, 2006, the disclosure of which is hereby incorporated by reference.

The present disclosure is directed to an enhanced recordation device for rail car inspections.

In North America, the main competitor against the rail industry is the trucking industry. The most significant hurdles for the rail industry in capturing more of the North Atlantic market are reducing transit time and reducing transit time variability. Rail yard operations are central to any effort to reduce transit time and transit time variability. Rail yards account for upwards of fifty percent of total car transit time and transit time variation. Typically, thirty five to fifty percent of all carloads endure one or more yard-based switch events per trip. For the remaining carloads, mainline fluidity is contingent upon yards receiving and departing trains as scheduled. As a result, on-time train departure performance is approximately forty to eighty percent and car connection performance is approximately thirty to seventy percent. These levels of performance typically result from a lack of coordination among yard activities. Poor planning is endemic in the yard because of the inherent complexity of the equation that the planner is attempting to solve in order to perfectly synchronize the operation. Because of his limitations, the planner typically reaches a sub optimal solution, which results in poor utilization of yard resources and ultimately underperformance (relative to some theoretical capability). The nature of yard operations, i.e. a highly variable inflow and the occurrence of catastrophic events, makes planning more difficult some days than others. Also, there is significant variability in each yard manager's ability to solve the planning equation.

A rail yard consists of a number of sub yards with each sub yard designed to perform specific tasks. Before a train enters a rail yard, the train is typically under the control of a network movement plan generated by a line-of-road planner and executed by a dispatcher. As the train enters the rail yard, the responsibility for the movement of the train is passed from the dispatcher to rail yard personnel. The rail yard personnel will control the movement of the train pursuant to a rail yard movement plan. The rail yard movement plan is different than the line of road movement plan in that the line of road movement plan considers a train as a single entity and plans the use of resources to move the train without conflict through the rail network. In the rail yard, the train consist will be divided into individual cars and thus the rail yard movement plan must account for the individual movement of each of the cars and locomotive until a reconstituted train having different cars is released from the rail yard to the line of road movement planner. Typically, the movement plan for the rail yard is generated manually and takes into account the various services and resources that are required to process the incoming cars.

One typical configuration of a rail yard includes a receiving yard for receiving a train from a network of tracks. The receiving yard includes one or more sets of track to receive a train from the line of road tracks and permit rail yard personnel to inspect the train. The locomotives are detached from the railcars and further inspection and maintenance is accomplished. Railcars are then moved from the receiving yard to classification tracks. The railcars are classified in blocks of common destination. The classification yard can be either a flat-switched classification yard (requiring a motive force) or a hump yard. The hump yard typically includes a hill, which feeds into a set of classification tracks to allow individual rail cars to be gravity fed to the appropriate classification track as a function of the destination of the railcar. Cars having a common destination are fed to a common track. A series of switches down stream of the hump control the track to which the car is routed. Once the railcars are classified in blocks, they are moved as blocks to the departure yard. The departure yard manager directs each block to a departure track based on its subsequent destinations. At the departure yard, the cars are inspected and the train consist is brake tested and powered up and prepared for release to the network of mainline track under control of the dispatcher. Although larger yards may have dedicated tracks used for receiving, classifying and departing railcars and trains, some yards use common tracks to perform the required tasks and do not have tracks dedicated to a specific purpose, e.g., common tracks are used for receiving and classifying.

Typically, the scheduling of train movement in the yard is largely a manual effort including (a) estimating train arrival time by conferencing with line-of-road operations management officials, (b) negotiating between line-of-road and yard officials about the time at which each train will be accepted by the yard, (c) allocating a set of receiving tracks to an inbound train based on intuition and static business rules communicated by word of mouth, (d) assigning workers to inbound car inspection tasks, reporting completion of inspection tasks, and requesting new assignments by physically reporting to the responsible yard manager, in-person, or by radio, (e) selecting a track or tracks to combine and hump, (f) communicating humping tasks to the hump engine crew in-person, or via radio, (g) coupling and pulling selected cars to the hump approach lead, (h) shoving selected cars over the hump at a prescribed rate, (i) planning trim and pull-down operations to move the classified car blocks from their classification tracks to the departure tracks in preparation for departure, (j) manually communicating trim and pull-down assignments to switch engine crews, in-person or via radio, (k) reporting completion of trim and pull-down assignments, in-person or via radio, (l) scheduling power and crew assignments to each outbound train, (m) assigning workers to outbound car inspection and departure preparation tasks, reporting completion of inspection tasks, and requesting new assignments by physically reporting to the responsible yard manager, in-person, or by radio, and (n) adjusting departure time estimates based on reported, estimated and/or actual resource availability times (e.g. crew and engine), and task completion times. Because many of these tasks are performed by yard personnel who report to the yard manager only upon completion of their assigned task, a common problem is the excessive dwell time of the railcars while waiting for the required tasks of inspecting and servicing to be completed by yard personnel.

Presently, the inspection of all inbound and outbound rail cars is a time consuming manual task that accounts for a significant portion of the time a rail car is required to spend in a rail yard. Inbound and outbound rail cars are sight-examined for defects that must be repaired before the cars join an outbound consist. These inspections require the car inspector to walk the length of the car string, inspect, record, and bad order tag as appropriate. The job often requires work in highly inclement weather, such as winter blizzards, which may adversely impact the time required to complete the inspection. In addition to the time it takes to manually inspect each rail car, there presently exists a time lag from the time that the inspection is completed to the time that the inspection results are reported to the yard manager. It is typical that the results of the inspection are not reported to the yard manager until the inspection of all cars in an inbound or outbound train are completed. Thus, if a deficiency or defect is noted during the inspection, the identification of the defect to the yard manager may not occur until some period of time after the defect is detected which could have an adverse impact on the movement planning process. For example, a delay in the reporting of the defect to the yard manager may allow the yard manager to move the affected rail car from the receiving track to the hump yard and eventually to a classification yard. The retrieval of the affected car from the classification yard will cause an unplanned delay that may serious impact the movement plans for the affected trains.

Currently, the typical train inspection is not transparent to the yard manager or to the train repair facility. The inspection crew, typically two, will mark those tracks having trains needing inspection with blue flags, signifying that workmen are on the tracks and preventing any train movement on the identified tracks. For example, if the inspectors have trains on five different tracks to inspect, it is the normal routine to blue flag all five tracks. These five tracks are thus unavailable to the yard manager until the inspection crew has completed the inspections. The unavailability of these tracks may seriously impact the railcar flow through the yard. During the inspection of these five tracks, there is no visibility of the inspection to the yard manager; that is the yard manager is not aware of the location of the inspectors or which trains are currently being inspected. This lack of visibility not only impacts throughput as discussed above, but also prevents monitoring of the productivity of the rail car inspectors.

In the past, train car inspectors made limited use of handheld devices in the receiving and departure yard inspection process. Most of the prior art devices provide recordation means, but limited functionality for integrating data in a form usable by the operations/transportation department management team in real time to increase the efficiency of the car movements in the yard. For example some devices that are used in the field only communicate with the repair facilities; other devices are integrated into the rail yard's billing system. However, these devices do not include functionality that encourages rail car inspectors to complete the inspection and documentation of the inspection while the inspector is present at the inspected rail cars. The productivity of rail car inspectors is greatly reduced, and unnecessary delays are encountered when the rail car inspectors must leave the tracks to complete required reporting and documentation of their inspection. It is not uncommon presently for train inspectors to complete an inspection and return to their work shed to complete necessary paperwork. In circumstances where an inspection has been completed and verbally reported to the yard manager as completed, the yard manager may begin moving trains prior to the completion of the inspector's paperwork. This may result in rail cars, which have been identified as having a defect by the inspector, being classified and moved to an outbound train. The retrieval of this defective rail car from an outbound train requires cutting the car out of the built train in the departure yard, which can result in late train departure. Thus, the failure of an inspector to have the ability to immediately identify a defective car may allow a defective car to be moved to an outbound train instead of the repair facility and therefore exacerbate the delay in moving the railcars through the yard.

There presently is a need to make the inspection process more efficient, less onerous on the inspectors, and better integrated into the emerging electronic management information system of a modem rail yard.

These and many other objects and advantages of the present disclosure will be readily apparent to one skilled in the art to which the disclosure pertains from a perusal of the claims, the appended drawings, and the following detailed description of the embodiments.

BRIEF DESCRIPTION OF THE DRAWINGS

FIG. 1 is a simplified pictorial representation of one embodiment of an enhanced recordation device.

DETAILED DESCRIPTION

With reference to FIG. 1, in one embodiment, the enhanced recordation device 100 is a computer enabled device that can be easily carried by the inspector during inspections. The device 100 may be in radio communication with a yard management execution system 110 to provide results from the inspection and to access information from the yard management execution system 110. In one embodiment, the yard management execution system 110 may be in communication with a car management system 130 and the yard manager 120. The car management system (CMS) 130 may contain information relating to the rail cars, including maintenance history, prior defects, schedules, rail car characteristics, special handling instructions, and other rail specific information that may be useful to the inspector. The yard manager 120 is responsible for managing the yard operation, and can access all information received by the yard management execution system 110 from the recordation device 100. The yard manager 120 may utilize a display remote from the recordation device 100 to monitor the real-time inspection of the rail cars. The yard management execution system 110 may also communicate with a yard repair facility which allows the repair facility to prepare for the receipt of cars requiring maintenance. The repair facility may in turn provide information regarding the status of repairs being conducted to the yard management execution system 110 to assist the yard master in predicting the availability of repaired rail cars. In an alternative embodiment (not shown) the device 100 may communicate directly with the car management system 130 or the yard manager. The device 100 may include several programs modules which contain the functionality to assist the rail car inspectors in the performance of his job.

Scanner module 140 is used to process identifying information for a rail car and may be used in conjunction with an electronic reader. In one embodiment the scanner module may include Automatic Equipment Identifier (AEI) functionality to read tags attached to the rail car using an optical scanner. The identification tags located on the cars may be formatted in any well know computer readable format, e.g., barcodes. In another embodiment, the identification of the rail car may be manually input by the inspector. In yet another embodiment, the rail cars may contain radio frequency identification devices (RFI), and module 140 may include an RFI scanner.

Location module 150 may include location determining functionality that enables the device to determine its geographic location. In one embodiment, the location module may include a GPS receiver for determining the location of the device and periodically transmitting its location to the yard management execution system 110. In another embodiment, the location module 150 may contain processing functionality to determine the location of the device from the characteristics of a received signal. Such processing functionality may include time of arrival processing, time difference of arrival processing, angle of arrival processing, power level processing, and other well know signal processing which can be used to locate a mobile device. The location may be determined as a longitude and latitude, or may be converted to a coordinate system useful for providing a visual display of the location on the appropriate track.

Location may also be derived using the scanner module 140. In one embodiment, AEI tags could be permanently located throughout the yard, either placed on the field side of track ties or affixed to posted placed in the ground between tracks. When scanned, these tags provide a signpost location mechanism that used locally by the handheld device or remotely to determine the absolute location within the rail yard. Likewise, RFI tags placed at known locations throughout the yard can be read by an RFI scanner in module 140 to determine location of the device.

The location module 150 may also include sensors such as accelerometers, compass and gyroscopes to enable location determination via dead reckoning, or any combinations of methods and devices discussed above.

Location processing functionality can be used in several ways. The location of a rail car can be determined and associated with the identification of the rail car determined from the scanner module 140 and be provided to the yard management execution system 110 to provide a location of the railcar. The location of the rail car may be used by the yard manager 120 to plan the next movement of the car, or used by the repair facility to locate a car with a defect.

The location functionality of the device may also be used to track the location and the progress of the inspector during the inspection. This functionality has several advantages. One, only those tracks which are currently undergoing an inspection, as indicated by the location of the device 100 need be blue-flagged. Adjacent tracks may remain available to the yard manager to move rail yard resources. In the past, a block of tracks were blue flagged without regard to whether a section of track was currently involved in an inspection, and was not released to the transportation department until the inspection on the surrounding tracks was complete. With the present device, only those tracks which are currently involved in the inspection can be identified and blue flagged, which increases the resources available to the yard manager. Second, the location of the inspector allows the inspector to track the real time current progress of the inspection which may assist the yard manager in estimating the time of completion of the inspection.

Additionally, the location module can be used to promote the efficiency of the inspection by enabling selected functionality of the handheld device 100 only when the device is located in a specified geographic location. For example, the handheld device 100 may not be able to send a defective car report unless the device is located at the site of the inspection, i.e., on the tracks. Thus, the inspector will be forced to issue all defective rail car reports and other required documentation from the field. This geographic constrained functionality ensures that the yard manager has received the defective car report in real time while the inspector is still in the field. Thus at the completion of the inspection, the yard manager is fully aware of all defective cars and thus will not inadvertently move defective cars to the classification yard and ultimately to the outbound tracks. Alternately, the selected functionality of the device 100 may be disabled if the location module determines that the device is not located near the tracks where the inspection has been authorized to be performed. Thus, the geolocation constrained functionality may eliminate the delays associated with the inspectors leaving the inspection tracks to complete the inspection requirements.

Inspection module 160 facilitates the inspection being performed. The inspection module may provide a display offering a menu of options for the user to choose. The user may select options through the use of buttons or interactive touch displays using drill down technology or pull down menu technology, or may utilize voice recognition software that does not require the user physically contact the buttons or interactive displays.

The inspection module may provide standard report forms with data pre-filled with predetermined information, or information determined by the device. For example, scanner module 140 may determine the identification of a rail car and location module 150 may determine the location of the rail car. If the inspector needs to prepare a defective car report, the report form will automatically be populated with the identification and location of the rail car. Inspection module 160 may also access information maintained in the car maintenance system 130. For example, CMS 130 may communicate information to the recordation device 100 for use during the inspection including defect types, specifications, images, etc. The device may also be provided with the maintenance history of a car that would provide valuable information not previously available on an ad hoc basis to the inspector. For example, the inspector may select to view the maintenance history of a rail car with an identified defect to determine whether the defect is a recurring problem and what corrective measures were performed in the past.

Imaging module 180 allows the inspector to make a photographic record during the inspection process. For example, the inspector can take a digital picture record of the defect, log the defect using the inspection module 160, associate the photograph from the imaging module 180 with the defect report from the inspection module 160 and transmit the report with picture to the car management system 110 via a wireless link. The imaged defect may assist the car repair facilities in quickly identifying the defect(s) that caused the car to be "bad ordered" by the field inspectors and allow the car repair facilities to reduce the total time that a car dwells in the yard.

Because rail car inspections may occur during inclement weather and in harsh environments, the handheld device 100 may have special functionality to facilitate inspections in harsh environments. In one aspect, the inspection module 160 makes use of pull down menus and pre-filled in electronic forms. Pull down menus and pre-filled forms ease the burden of the inspector operating in a harsh environment and help eliminate a source of common errors in inspection—penmanship issues. Additionally, printer module 170 allows in the field printing capability for defective car tags. The in-situ automatic printing of car tags avoids common problems in reading the tags caused by illegible writing. During a typical inspection a railcar inspector is required to generate a bad order tag to affix to the car to signify that the car has a defect that requires repair. In the past illegible handwriting has been a common cause of unnecessary delay in identifying and correcting defects. Harsh weather or environmental factors exacerbate the delay issues caused. Printer module 170 allows the bad order tags to be generated with pull down menus and selectable options and pre-filed in forms which minimize the manual input required of inspectors.

In another embodiment, the inspector may be provided with gloves specially adapted to operate the recordation device for use in harsh weather environments. For example, the gloves may be provided with a built-in stylus for use with an electronic tablet to facilitate operation of the device without the need for removing the gloves.

Communication module 190 transmits information between the yard management execution system 110 and the recordation device 100. Communication module may also transmit information directly to yard manager 120 and car management system CMS 130. Communication module 190 may receive information from any of the other modules 140-180 and transmit this information to the yard management execution system 110. CMS 130 may provide information relating to the inspected rail cars including maintenance history, prior defects, schedules, rail car characteristics, and special handling instructions. Communication module 190 may also communicate with other enhanced recordation devices. Communications between the yard manager execution system 110 and device 100 may be event driven, or may be initiated at predetermined intervals.

The yard management execution system may contain a database that stores information for all yard activities, including information received form recordation devices 100. The yard manager 120 can use a display to access and display information from the yard management execution database to determine and monitor the real-time conditions in the yard to assist the yard manager in planning the utilization of resources and the movement of cars through the yard.

While preferred embodiments of the present disclosure have been described, it is understood that the embodiments described are illustrative only and the scope of the disclosure is to be defined solely by the appended claims when accorded a full range of equivalence, many variations and modifications naturally occurring to those of skill in the art from a perusal hereof.

What is claimed:

1. A non-transitory computer program product comprising:

a non-transitory computer usable medium having one or more computer readable program code modules embodied in said medium for recording results of a rail car inspection, the one or more computer readable program code modules configured to direct a processor to:

determine a geographic location of a device on a communications network having a management information system;

provide a preformatted display on the device relating to a rail car inspection and to receive user input;

scan computer readable identification information to identify a rail car that is a subject of the rail car inspection;

print information representative of the rail car inspection;

create a photographic image representative of the rail car inspection; and transmit the information representative of the rail car inspection or the photographic image to the management information system, wherein the one or more computer readable program code modules are configured to direct the processor to prevent transmission of the information representative of the rail car inspection to the management information system after completion of the rail car inspection when the device is outside of a designated vicinity of the rail car that is the subject of the rail car inspection.

2. The computer program product of claim l wherein the one or more computer readable program code modules are configured to direct the processor to at least one of provide the preformatted display on the device, scan the computer readable identification information, print the information representative of the rail car inspection, create the photographic image, or transmit the information representative of the rail car inspection only when the device enters a predetermined geographic area around the rail car.

3. The computer program product of claim 2 wherein the predetermined geographic area corresponds to a portion of a rail yard authorized for rail car inspections.

4. The computer program product of claim 1, wherein the information representative of the rail car inspection includes a rail car inspection report.

5. The computer program product of claim 1, wherein the information that is printed includes a bad order tag for the rail car.

6. The computer program product of claim 1, wherein the one or more computer readable program code modules are configured to provide an interactive display on the device of pull down menus corresponding to selected options for a user of the device.

7. The computer program product of claim 1, wherein the one or more computer readable program code modules are configured to provide preformatted forms that are pre-filled in with one or more of the geographic location of the device, the computer readable identification information of the rail car, or the photographic image of the rail car.

8. The computer program product of claim 1, wherein the one or more computer readable program code modules are configured to transmit the geographic location of the device at a location of the rail car inspection so that the management information system can at least one of restrict use of a track on which the rail car being inspected is located by one or more other rail cars or allow use of one or more other tracks on which the rail car being inspected is not located by the one or more other rail cars.

9. The computer program product of claim 1, wherein the one or more computer readable program code modules are configured to obtain a maintenance history of the rail car that is the subject of the rail car inspection from the management information system when the device is within the designated vicinity of the rail car.

10. A non-transitory computer program product comprising:

a non-transitory computer usable medium having one or more computer readable program code modules embodied in said medium and configured to direct a processor to:

determine a geographic location of a device on a communications network;

provide a preformatted display on the device that relates to a rail car inspection and to receive user input; and scan computer readable identification information to identify a rail car that is a subject of the rail car inspection;

wherein the one or more computer readable program code modules are configured to direct the processor to prevent transmission of information representative of the rail car inspection to a remote management information system after completion of the rail car inspection when the geographic location of the device is outside a predetermined geographic area around the rail car that is the subject of the rail car inspection.

11. The computer program product of claim 10 wherein the predetermined geographic area corresponds to a portion of a rail yard authorized for rail car inspections.

12. The computer program product of claim 10 wherein the one or more computer readable program code modules are configured to direct the processor to print the information representative of the rail ear inspection.

13. The computer program product of claim 12, wherein the information that is printed includes a bad order tag for the rail car.

14. The computer program product of claim 10 wherein the one or more computer readable program code modules are configured to direct the processor to create a photographic image.

15. The computer program product of claim 10, wherein the one or more computer readable program code modules are configured to transmit the geographic location of the device at a location of the rail car inspection so that the management information system can at least one of restrict use of a track on which the rail car being inspected is located by one or more other rail cars or allow use of one or more other tracks on which the rail car being inspected is not located by the one or more other rail cars.

16. The computer program product of claim 10, wherein the one or more computer readable program code modules are configured to obtain a maintenance history of the rail car that is the subject of the rail car inspection from the management information system when the device is within the predetermined geographic area around the rail car.

17. A system comprising:

a database containing information relevant to rail cars being inspected and information related to a rail yard; and a handheld processor including:

a display for providing a menu of options for conducting a rail car inspection of a rail car and recording user input in response to the menu;

a location module for determining a geographic location of the handheld processor; and a transceiver in communication with said database for communicating the user input and the geographic location of the handheld processor to the database;

wherein the handheld processor is configured to prevent transmission of the user input to the database upon completion of the rail car inspection when the geographic location of the handheld processor is outside a designated vicinity around the rail car that is a subject of the rail car inspection.

18. The system of claim 17 wherein the handheld processor includes a printer for printing the user input.

19. The system of claim 17 wherein the handheld processor includes a scanner for identifying the rail car that is the subject of the rail car inspection.

20. The system of claim 17 wherein the handheld processor includes an imaging device to capture an image of the rail car.

21. The system of claim 17 further comprising a glove for receiving one or more fingers, the glove including a stylus extending from at least one of the one or more fingers to facilitate communicating the user input to the display.

22. The system of claim 17 wherein the handheld processor is configured to receive the user input when the geographic location of the handheld processor is within a predetermined geographic boundary.

23. The system of claim 17, wherein the handheld processor is configured to transmit the geographic location of the handheld processor at a location of the rail car inspection so that a remotely located management information system can at least one of restrict use of a track on which the rail car being inspected is located by one or more other rail cars or allow use of one or more other tracks on which the rail car being inspected is not located by the one or more other rail cars.

24. The system of claim 17, wherein the handheld processor is configured to obtain a maintenance history of the rail car that is the subject of the rail car inspection from a remotely located management information system when the handheld processor is within the designated vicinity of the rail car.

* * * * *